United States Patent
Saber et al.

(10) Patent No.: US 12,294,955 B2
(45) Date of Patent: May 6, 2025

(54) SYSTEM AND METHOD FOR PROVIDING LOOK-AHEAD DYNAMIC POWER CONTROL FOR CARRIER AGGREGATION

(71) Applicant: Samsung Electronics Co., Ltd., Gyeonggi-do (KR)

(72) Inventors: Hamid Saber, San Diego, CA (US); Yuan-Sheng Cheng, San Diego, CA (US); Jung Hyun Bae, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 272 days.

(21) Appl. No.: 17/740,945

(22) Filed: May 10, 2022

(65) Prior Publication Data
US 2022/0272642 A1   Aug. 25, 2022

Related U.S. Application Data

(63) Continuation of application No. 16/886,356, filed on May 28, 2020, now Pat. No. 11,343,779.
(Continued)

(51) Int. Cl.
*H04W 72/0446* (2023.01)
*H04L 5/00* (2006.01)
(Continued)

(52) U.S. Cl.
CPC ......... *H04W 52/346* (2013.01); *H04L 5/0032* (2013.01); *H04W 52/146* (2013.01);
(Continued)

(58) Field of Classification Search
CPC ..... H04W 72/04; H04W 16/14; H04W 52/04; H04W 52/08; H04W 52/16; H04W 52/00;
(Continued)

(56) References Cited

U.S. PATENT DOCUMENTS

| | | |
|---|---|---|
| 9,642,098 B2 | 5/2017 | Dinan |
| 10,064,191 B2 | 8/2018 | Dinan |

(Continued)

FOREIGN PATENT DOCUMENTS

| | | |
|---|---|---|
| CN | 105992325 | 10/2016 |
| CN | 106465295 | 2/2017 |

(Continued)

OTHER PUBLICATIONS

3GPP TS 38.214 V16.0.0 (Dec. 2019); Technical Specification 3rd Generation Partnership Project;Technical Specification Group Radio Access Network; NR; Physical.
(Continued)

*Primary Examiner* — Tu X Nguyen
(74) *Attorney, Agent, or Firm* — The Farrell Law Firm, P.C.

(57) ABSTRACT

Methods and apparatuses are provided for providing dynamic power sharing at a user equipment (UE). A first uplink transmission is configured on a secondary cell group (SCG). An offset from a starting symbol of the first uplink transmission is determined, by the UE, based on a physical uplink shared channel (PUSCH) preparation time for a PUSCH timing capability. Based on the offset, a group of overlapping uplink transmissions on a master cell group (MCG) is defined. A total power is shared among uplink transmissions in the group of overlapping uplink transmissions on the MCG and the first uplink transmission on the SCG.

21 Claims, 10 Drawing Sheets

Related U.S. Application Data

(60) Provisional application No. 62/971,708, filed on Feb. 7, 2020, provisional application No. 62/875,801, filed on Jul. 18, 2019, provisional application No. 62/875,756, filed on Jul. 18, 2019.

(51) Int. Cl.

| | | |
|---|---|---|
| *H04W 52/14* | (2009.01) | |
| *H04W 52/34* | (2009.01) | |
| *H04W 52/40* | (2009.01) | |
| *H04W 72/044* | (2023.01) | |
| *H04W 72/23* | (2023.01) | |
| *H04W 72/56* | (2023.01) | |

(52) U.S. Cl.
CPC ......... *H04W 52/40* (2013.01); *H04W 72/044* (2013.01); *H04W 72/23* (2023.01); *H04W 72/56* (2023.01)

(58) Field of Classification Search
CPC . H04W 52/10; H04W 72/0446; H04W 84/20; H04W 88/06; H04W 72/12; H04B 7/04
See application file for complete search history.

(56) References Cited

U.S. PATENT DOCUMENTS

| | | |
|---|---|---|
| 10,142,945 B2 | 11/2018 | Papasakallariou |
| 10,368,322 B2 | 7/2019 | Dinan |
| 10,575,259 B2 | 2/2020 | Dinan |
| 2015/0282104 A1 | 10/2015 | Damnjanovic et al. |
| 2019/0082449 A1 | 3/2019 | Kim |
| 2020/0329832 A1 | 10/2020 | Wang |

FOREIGN PATENT DOCUMENTS

| | | |
|---|---|---|
| WO | WO 2011/137444 | 11/2011 |
| WO | WO 2015/026943 | 2/2015 |
| WO | WO 2015/108359 | 7/2015 |
| WO | WO2015116866 | 8/2015 |
| WO | WO2015139224 | 9/2015 |
| WO | WO 2016/011405 | 1/2016 |
| WO | WO 2018/175077 | 9/2018 |
| WO | WO 2018/203678 | 11/2018 |
| WO | WO 2019/051037 | 3/2019 |

OTHER PUBLICATIONS

Layer procedures for data (Release 16), pp. 154.
Motorola Mobility, Lenovo, "Uplink Power Control for NR-NR DC", R1-1907240, 3GPP TSG RAN WG1 #97, May 13-17, 2019, 6 pages.
ZTE Corporation, "Discussion on Uplink Power Control for NR-DC", R1-1906419, 3GPP TSG RAN WG1 Meeting #97, May 13-17, 2019, 6 pages.
European Search Report dated Dec. 14, 2020 issued in counterpart application No. 20186041.8-1205, 8 pages.
CATT, "Further Details on NR 4-Step RA Procedure", R1-1806271, 3GPP TSG RAN WG1 Meeting #93, May 21-25, 2018, 9 pages.
Taiwanese Office Action dated Feb. 29, 2024 issued in counterpart application No. 109123712, 15 pages.
Apple Inc., "Feature Lead Summary #4 for Uplink Power Control for NR-NR DC", R1-1913573, 3GPP TSG-RAN WG1 #99, Nov. 18-22, 2019, 16 pages.
Huawei, HiSilicon, "UL Power Control for NR-NR Dual Connectivity", R1-1901551, 3GPP TSG RAN WG1 Meeting #96, Feb. 25-Mar. 1, 2019, 6 pages.
MediaTek Inc., "Remaining Issues on BWP Switch Delay", R4-1900516, 3GPP TSG-RAN WG4 Meeting #90, Feb. 25-Mar. 1, 2019, 7 pages.
Japanese Office Action dated Apr. 23, 2024 issued in counterpart application No. 2020-120507, 12 pages.
Japanese Office Action dated Aug. 2, 2024 issued in counterpart application No. 2020-120507, 4 pages.
Chinese Office Action dated Sep. 28, 2024 issued in counterpart application No. 202010663288.6, 9 pages.
Chinese Office Action dated Feb. 25, 2025 issued in counterpart application No. 202010663288.6, 4 pages.

SYSTEM AND METHOD FOR PROVIDING LOOK-AHEAD DYNAMIC POWER CONTROL FOR CARRIER AGGREGATION

PRIORITY

This application is a Continuation Application of U.S. application Ser. No. 16/886,356, filed in the U.S. Patent and Trademark Office (USPTO) on May 28, 2020, which is based on and claims priority under 35 U.S.C. § 119(e) to a U.S. Provisional Patent Application filed on Feb. 7, 2020 in the USPTO and assigned Ser. No. 62/971,708, a U.S. Provisional Patent Application filed on Jul. 18, 2019 in the USPTO and assigned Ser. No. 62/875,756, and a U.S. Provisional Patent Application filed on Jul. 18, 2019 in the USPTO and assigned Ser. No. 62/875,801, the contents of which are incorporated herein by reference.

FIELD

The present disclosure relates generally to carrier aggregation (CA) power control, and more particularly, to a method and system for look-ahead dynamic power control for CA.

BACKGROUND

CA was introduced in $3^{rd}$ Generation Partnership Project (3GPP) to allow a user equipment (UE) to simultaneously transmit and receive data on multiple component carriers (CCs) from a single node (e.g., an evolved node B (eNB)). CA increases user throughput as the aggregated bandwidth is increased.

In 3GPP Release 15 (Rel-15), there exists no timeline for prioritization of UE uplink (UL) power control in CA, and the priority rule is applied in a symbol-by-symbol manner. This varying symbol-by-symbol power during a single transmission can be damaging if the transmission duration is short.

Dual connectivity (DC) was introduced in 3GPP Rel-12 for small cell enhancement. DC allows a UE to simultaneously transmit and receive data on multiple component carriers from two cell groups (CGs) via a master node and a secondary node. DC can increase user throughput, provide mobility robustness, and support load-balancing among eNBs. Compared to single connectivity, DC can provide higher per-user throughput by offloading data from a master node to a secondary node when the master node is overloaded.

In a typical scenario, a UE is first connected to the master node, and then connects to the secondary node. Evolved universal mobile telecommunications system (UMTS) terrestrial radio access network (E-UTRAN) refers to $4^{th}$ Generation (4G) or Long Term Evolution (LTE). E-UTRAN-New Radio (NR)-DC (EN-DC), NR-E-UTRA (NE)-DC, and NR-NR-DC (NN-DC) refer to the DC scenarios where the master node and secondary nodes are (eNB, next generation node B (gNB)), (gNB, eNB), and (gNB, gNB), respectively. eNB is used to define a node for 4G/LTE and gNB is used to define a node for 5G-NR. Rel-15 supports EN-DC, NE-DC, and NN-DC (or NR-DC). Deployment scenarios where the nodes are of different radio access technologies (RATS) are referred to as multi-RAT DC (MR-DC). NE-DC and EN-DC are two examples of MR-DC.

FIG. 1 is a diagram illustrating an NN-DC deployment scenario. UE-1 102 is connected to a single NR node (gNB), specifically, master gNB (MgNB) 104. UE-2 106 is also connected to a single NR node (gNB), specifically, secondary gNB-2 (SgNB-2) 108. UE-3 110 is simultaneously connected to two NR nodes (gNBs), specifically, MgNB 104 and SgNB-1 112. The MgNB configures a set of serving cells within a master cell group (MCG) and each SgNB configures a set of serving cells within a respective secondary cell group (SCG). The primary cell of the MCG is referred to as a PCell, while the secondary cells of the MCG are referred to as SCells. The primary cell of the SCG is referred to as a PSCell. PCells and PSCells are also referred to as special cells (SpCell).

SUMMARY

According to one embodiment, a method is provided for providing dynamic power sharing at a UE. A first uplink transmission is configured on an SCG. An offset from a starting symbol of the first uplink transmission is determined, by the UE, based on a physical uplink shared channel (PUSCH) preparation time for a PUSCH timing capability. Based on the offset, a group of overlapping uplink transmissions on an MCG is defined. A total power is shared among uplink transmissions in the group of overlapping uplink transmissions on the MCG and the first uplink transmission on the SCG.

According to one embodiment, a UE is provided that includes a processor, and a non-transitory computer readable storage medium that stores instructions. When executed, the instructions cause the processor to configure a first uplink transmission on an SCG. The instructions also cause the processor to determine an offset from a starting symbol of the first uplink transmission based on a PUSCH preparation time for a PUSCH timing capability. The instructions also cause the processor to define, based on the offset, a group of overlapping uplink transmissions on an MCG. The instructions also cause the processor to share a total power among uplink transmissions in the group of overlapping uplink transmissions on the MCG and the first uplink transmission on the SCG.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
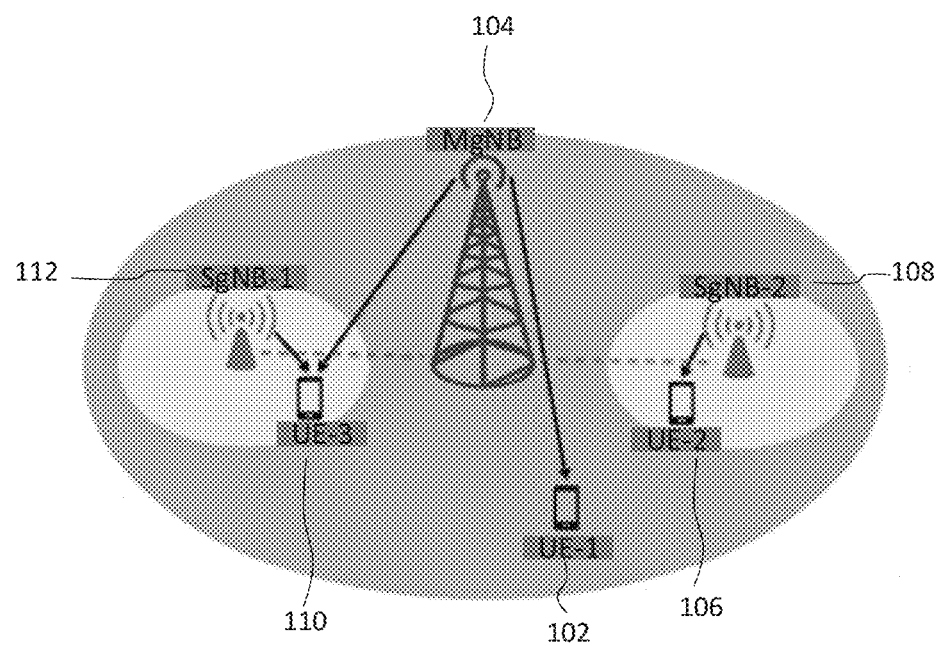
FIG. 1 is a diagram illustrating an NN-DC deployment scenario.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

In order to determine the power of a transmission on a given cell for DC, a power control mechanism is employed to determine the transmission power within each CG. Such a power determination mechanism is referred to as CA power control and aims to determine the power for each transmission on a set of serving cells within a CG. If a UE is in DC mode, a CA power control is used to determine the power of a MCG and a SCG with further possible interactions between the two CA power control mechanisms for the CGs. However, if the UE is not in DC mode (i.e., it is only configured with a set of serving cells in one CG), CA power control is employed to determine the power of transmissions on the CG.

With CA power control, a maximum total power $P_{CG}$ for the CG is determined for a UE. The power of each individual transmission is determined according to a single-transmission power control scheme. With CA power control, it is ensured that the total power on any given symbol across all the serving cells does not exceed the maximum total power $P_{CG}$. If the total power exceeds the maximum total power $P_{CG}$, a priority rule is applied to drop/scale a power of lowest priority channels/signals such that the total power is within the maximum total power $P_{CG}$.

Figure 2:
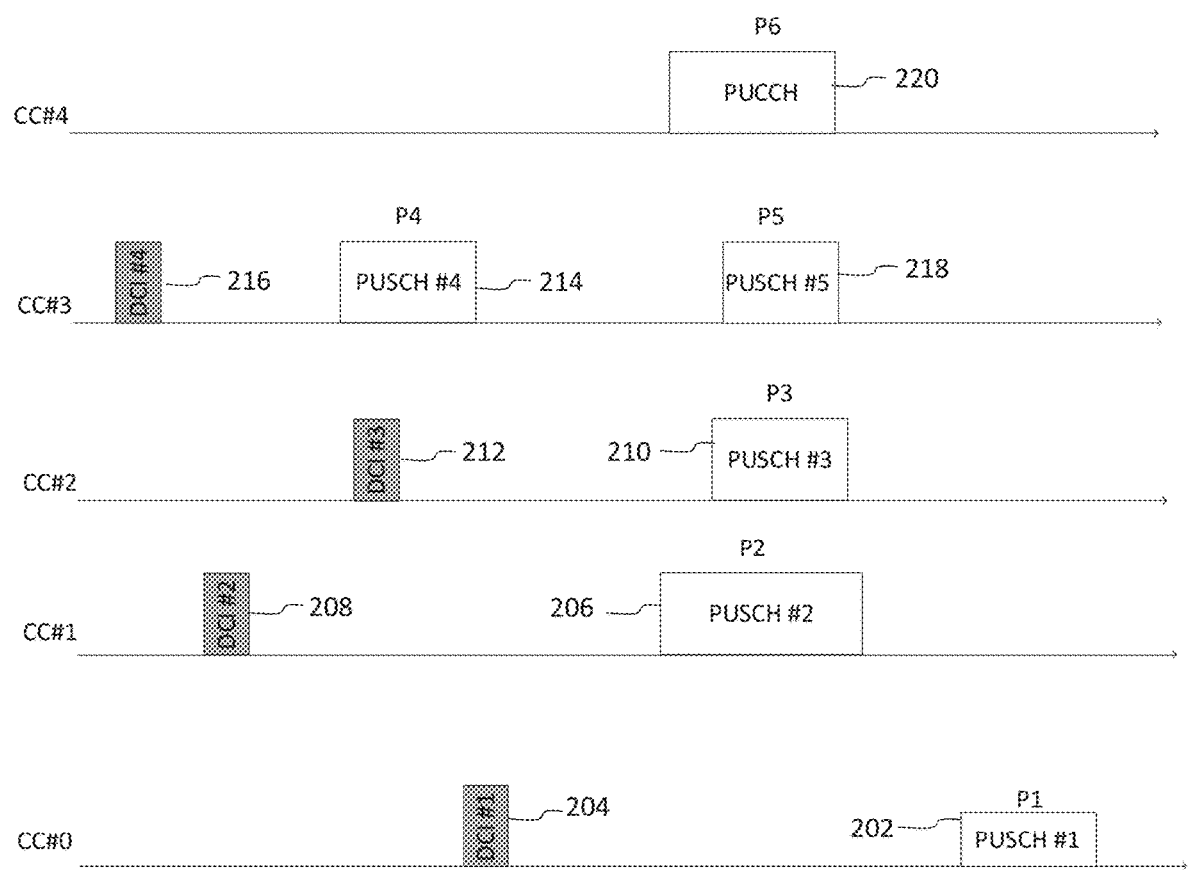
FIG. 2 is a diagram illustrating CA power control, according to an embodiment.

FIG. 2 is a diagram illustrating CA power control, according to an embodiment. PUSCH-1 202 on CC-0 is scheduled by downlink control information (DCI)-1 on physical downlink control channel (PDCCH) 204. PUSCH-2 206 on CC-1 is scheduled by DCI-2 on PDCCH 208. PUSCH-3 210 is scheduled on CC-2 by DCI-3 on PDCCH 212. PUSCH-4 214 is scheduled on CC-3 by DCI-4 on PDCCH 216. PUSCH-5 218 is scheduled on CC-3, and PUSCH-6 220 is scheduled on CC-4. It is ensured that the power of PUSCH-4 214 is less than the maximum total power $P_{CG}$ (i.e., $P4 < P_{CG}$). Additionally, it is ensured that the sum of the powers of PUSCH-2 206, PUSCH-3 210, PUSCH-4 218, and PUSCH-5 220 is less than the maximum total power $P_{CG}$ (i.e., $P2+P3+P5+P6 < P_{CG}$). Further, it is ensured that the power of PUSCH-1 202 is less than the maximum total power $P_{CG}$ ($P1 < P_{CG}$).

The uplink transmission is shown and described in embodiments herein as PUSCH for illustrative purposes only. The uplink transmission may be embodied as any uplink channel/signal configured via DCI, such as, for example, channel state information (CSI), PUSCH, and physical uplink control channel (PUCCH). The uplink transmission may also be embodied as any uplink channel/signal configured via configured grant, such as, for example, radio resource control (RRC), cell group (CG)-PUSCH, PUCCH, sounding reference signal (SRS), and physical random access channel (PRACH).

Generally, when determining the power of a certain transmission occasion, other overlapping transmissions in other CCs are jointly considered if they are semi-static or if their corresponding DCIs are transmitted early enough.

An overlapping transmission group may be considered a group of transmissions, each overlapping with at least one other transmission within a same time domain. Additionally, within the time domain, there should not be any time instance at which no transmission occurs. Further, no transmissions outside of the group overlap with transmissions inside the group.

For a group of overlapping uplink transmissions, the leading transmission of the group is determined as the transmission having a starting symbol earliest within the group. For CCs other than that which the leading transmission belongs to, an offset $X_\mu$ is defined. An offset X is defined as the maximum $X_\mu$ across all $\mu$ of the UL transmissions, i.e., $$X = \max_\mu X_\mu.$$

Dynamic grant based transmissions having a corresponding scheduling DCI that transmitted on a PDCCH after the corresponding offset X are dropped from the group. The resulting final group is used for evaluating power.

An offset $X_\mu$ is calculated as set forth in Equation (1) below, and is defined for each CC, based on a PDCCH decoding time and a power calculation and adjustment time, for which PUSCH preparation time is an upper bound.

$$X_\mu = \alpha N_2^\mu \quad (1)$$

$N_2^\mu$ is the PUSCH preparation time (e.g., as defined in subclause 6.4 of TS 38.214), and the time unit is in symbols of the associated CC. $\alpha$ is defined between 0 and 1. $\mu$ corresponds to a subcarrier spacing (SCS) of the DL with which the PDCCH carrying the DCI scheduling the PUSCH was transmitted, or the SCS of the UL with which the PUSCH is to be transmitted. The PUSCH preparation time is based on PUSCH timing capability 1, as set forth in Table 1, or on PUSCH timing capability 2, as set forth in Table 2.

TABLE 1

| μ | PUSCH preparation time $N_2$ [symbols] |
|---|---|
| 0 | 10 |
| 1 | 12 |
| 2 | 23 |
| 3 | 36 |

TABLE 2

| μ | PUSCH preparation time $N_2$ [symbols] |
|---|---|
| 0 | 5 |
| 1 | 5.5 |
| 2 | 11 for frequency range 1 |

Figure 3:
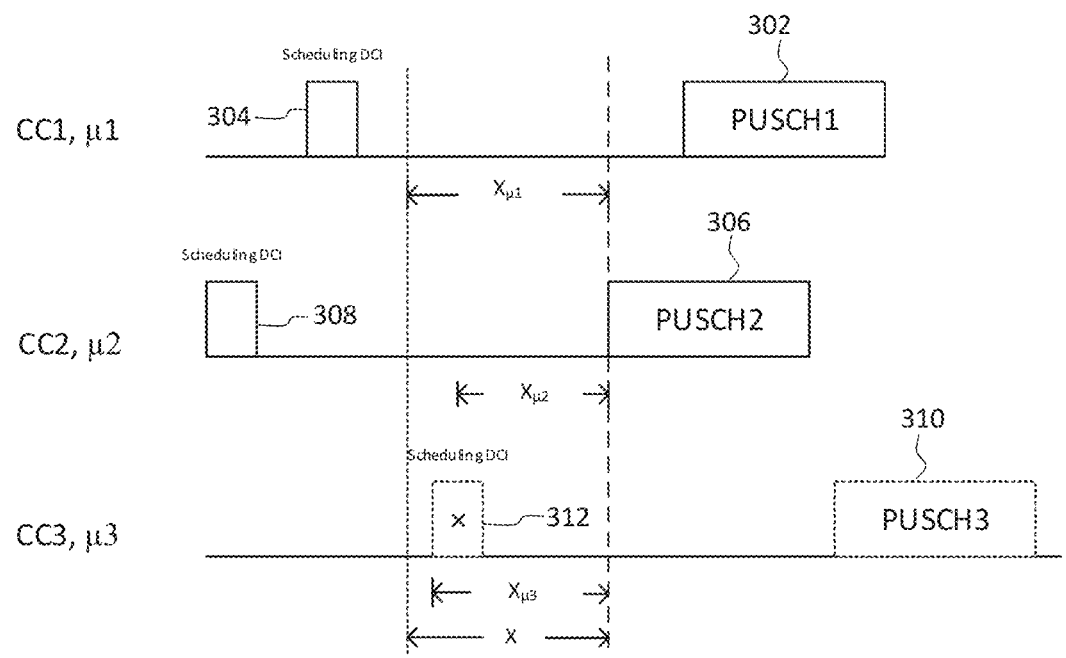
FIG. 3 is a diagram illustrating an overlapping transmission group, according to an embodiment.

Referring now to FIG. 3, a diagram illustrates an overlapping transmission group, according to an embodiment. PUSCH-1 302 is scheduled on CC-1 (where $\mu=\mu1$) by DCI on PDCCH 304. PUSCH-2 306 is scheduled on CC-2 (where $\mu=\mu2$) by DCI on PDCCH 308. PUSCH-3 310 is scheduled on CC-3 (where $\mu=\mu3$) by DCI on PDCCH 312. PUSCH-1 302, PUSCH-2 306, and PUSCH-3 310 form an overlapping transmission group. PUSCH-2 306 is the leading transmission. PUSCH-1 302 is kept in the transmission group because PDCCH 304 is before an offset X, which is measured from a starting symbol of PUSCH-2 306. As described above, X is defined as the maximum of $X_{\mu1}$, $X_{\mu2}$, and $X_{\mu3}$. PUSCH-3 310 is removed from the transmission group since PDCCH 312 arrives within the offset X, measured from the starting symbol of PUSCH-2 306. PUSCH-3 310 joins a future group.

The offset X ensures that when determining the power, information is received from all DCIs.

Thus, according to an embodiment, a decision boundary is moved to a start of a leading transmission since a same power is sought to be maintained throughout the transmission. Future transmissions are also enabled, as long as their long as their existence is known early enough.

The modified group of overlapping transmissions set forth in FIG. 3 is referred to as a power control chunk.

Figure 4:
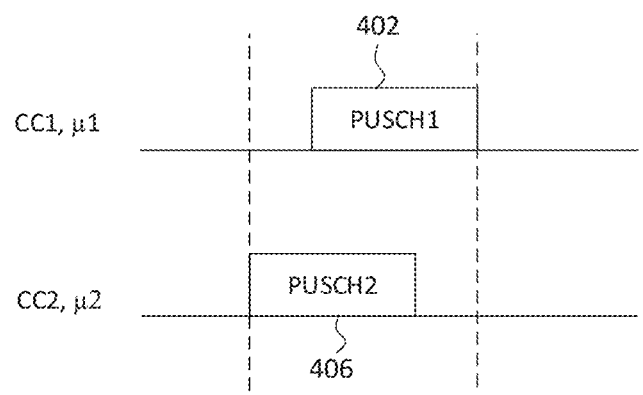
FIG. 4 is a diagram illustrating a power control chunk, according to an embodiment.

FIG. 4 is a diagram illustrating a power control chunk, according to an embodiment. The power control chunk includes PUSCH-1 402 on CC-1 and PUSCH-2 406 on CC-2.

Generally, a power control chunk includes a set of PUSCHs that are scheduled/triggered by DCIs satisfying a timeline, as described above with respect to FIG. 3. Any two PUSCHs in a power control chunk either directly or indirectly overlap with each other. Two PUSCHs overlap directly if they both are transmitted in at least one common symbol. Two PUSCHs overlap indirectly through another PUSCH. Specifically, PUSCH A indirectly overlaps with PUSCH B, when they do not directly overlap with each other, but each directly overlaps with PUSCH C. Two PUSCHs can overlap indirectly through a set of directly or indirectly overlapping PUSCHs.

A power control chunk can include configured grant PUSCHs, any other uplink channel/signal configured via grant, or any other uplink channel/signal configured via DCI.

The timeline of a power control chunk is defined with respect to a transmission with an earliest start symbol in the power control chunk, referred to as the leading transmission.

Any dynamic grant uplink transmission having a DCI that comes after X symbols before the start of the leading transmission is not included in the power control chunk.

A network can configure the UE via RRC configuration such that the power control chunk only includes channels/signals with the earliest start time (i.e., the leading channels/signals). The next power control chunk would include the channels/signals with the second smallest start time.

For a given power control chunk, a UE allocates power for UL transmissions based on a priority order while maintaining the same power during one transmission In order to implement the allocation, a set containing all transmissions in the power control chunk is identified. A single transmission with a highest priority is identified from the transmissions in the set. The identified transmission is allocated a scheduled power. If a current total power (i.e., a summation of powers of all current and previously identified transmissions) exceeds the maximum allowable power in at least one symbol of the transmission, the power of the currently identified transmission is scaled down so that the current total power does not exceed the maximum allowable power. If the power of the currently identified transmission is scaled down to zero, the identified transmission is dropped. The identified transmission is removed from the set, and if the revised set is not empty, a next transmission with a highest priority is identified from the remaining transmissions in the set, and the procedure repeats.

Figure 5:
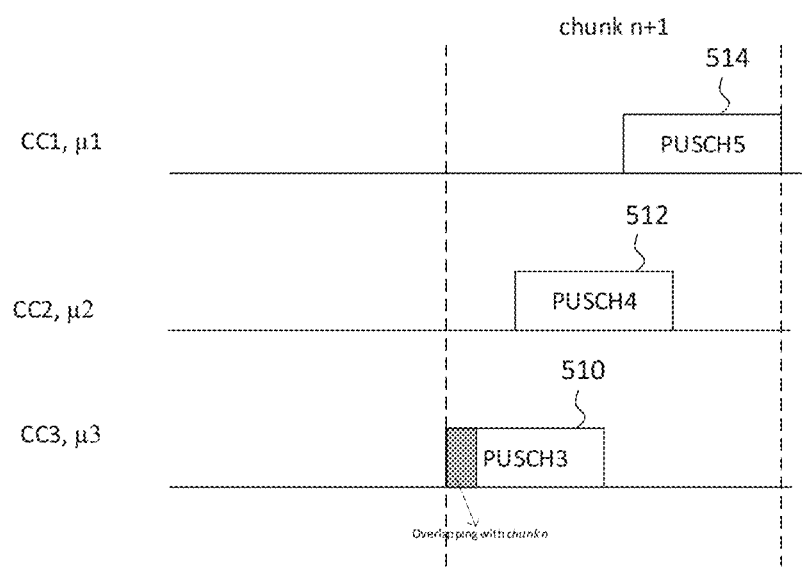
FIG. 5 is a diagram illustrating a next power control chunk, according to an embodiment.

A power for PUSCH-1 402 is $P_1$ and a power for PUSCH-2 406 is $P_2$. It is assumed that there are no uplink transmissions before the arrival of a scheduling DCI for PUSCH-2 406. The maximum allowable power for the entire duration of the power control chunk n is $P_{max}$. Assuming $P_{max} < P_1 + P_2$ and PUSCH-1 402 has a higher priority, PUSCH-1 402 will be allocated with $P_1$ and PUSCH-2 406 will be allocated with $\hat{P}_2 = P_{max} - P_1$ The phrase "maximum allowable power" has been used instead of a constant value (e.g., $P_{max}$) due to potential overlapping situations between different power control chunks. PUSCH-3 310 was removed from the formation of the power control chunk in FIG. 3. FIG. 5 is a diagram illustrating a next power control chunk, according to an embodiment. The overlapping transmissions include PUSCH-3 510 on CC-3, PUSCH-4 512 on CC-2, and PUSCH-5 514 on CC-3, and belong to a next chunk n+1. Chunk n+1 of FIG. 5 overlaps with chunk n of FIG. 3, Specifically, PUSCH-3 510 (PUSCH-3 310 of FIG. 3) partially overlaps PUSCH-1 302 of FIG. 3 in the time domain.

Figure 6:
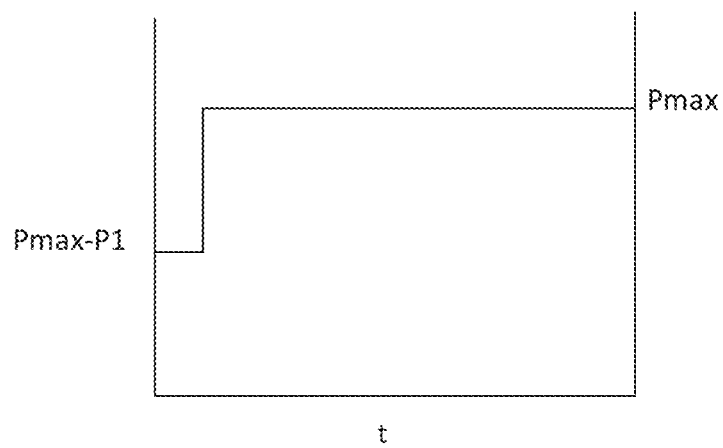
FIG. 6 is a diagram illustrating a a resulting maximum allowable power in the power control chunk of FIG. 5, according to an embodiment.

The priority rule for different chunks is in chronological order. Accordingly, power $P_1$ of 302 is taken in the overlapping time region. A first approach reduces the maximum allowable power in the overlapping region to maintain a constant maximum power $P_{max}$ at every time instant. FIG. 6 is a diagram illustrating a resulting maximum allowable power in the power control chunk of FIG. 5, according to an embodiment. This resulting maximum allowable power in chunk n+1 is not constant.

Applying such dynamic maximum allowable power, as show with respect to FIG. 6, can be challenging to UE. Another embodiment drops all transmissions that overlap with a previous power control chunk (e.g., PUSCH-3 510 of FIG. 5). In a further embodiment, a gNB ensures that overlapping power control chunks do not occur.

Power sharing methods for DC can be categorized as semi-static power sharing (SPS) or dynamic power sharing (DPS).

For SPS, the UE determines the transmission power within each CG according to the power control for CA with maximum total power $P_{CG}$ which is determined with possible consideration of semi-static transmission information in the other CG.

For DPS, the power determination of a transmission in one CG is determined by considering possible overlapping dynamically scheduled uplink transmissions in one or more other CGs.

With DPS, a UE considers overlapping transmissions that are dynamically scheduled on other CCs. DPS must define a timeline to determine which DCIs should be considered.

"Look-ahead" generally refers to a behavior where a LTE determines aspects of a signal/channel transmission at a given transmission occasion by considering subsequent transmissions.

For a look-ahead based power sharing scheme for NN-DC, the transmission power of transmission in a MCG is determined according to the CA power control rule independent of SCG. For an UL transmission on an SCG starting at time $T_0$, the UE checks possible PDCCHs in the MCG that are received before an offset ($T_0 - T_{offset}$) and schedule an overlapping UL PUSCH transmission on the MCG. If such PDCCHs exist, the UE determines the UL PUSCH transmission on the SCG with maximum allowable SCG power being the smaller of the maximum SCG power and the total NN-DC power less the actual transmission power of the MCG (i.e., min $\{P_{SCG}, P_{total}^{NN-DC} - \text{MCG actual TX power}\}$). If such PDCCHs do not exist, the UE determines the UL transmission on SCG with the maximum allowable power being the total NN-DC power $P_{total}^{NN-DC}$. The UE does not expect PDCCH(s) received after $T_0 - T_{offset}$ that schedule MCG UL PUSCH transmission(s) to overlap with the SCG transmission.

For DPS with look-ahead, a total power for the MCG $P_{MCG}$, a total power for the SCG $P_{SCG}$, and a total power across all CGs $P_{total}^{NN-DC}$ are provided to the UE.

Figure 7:
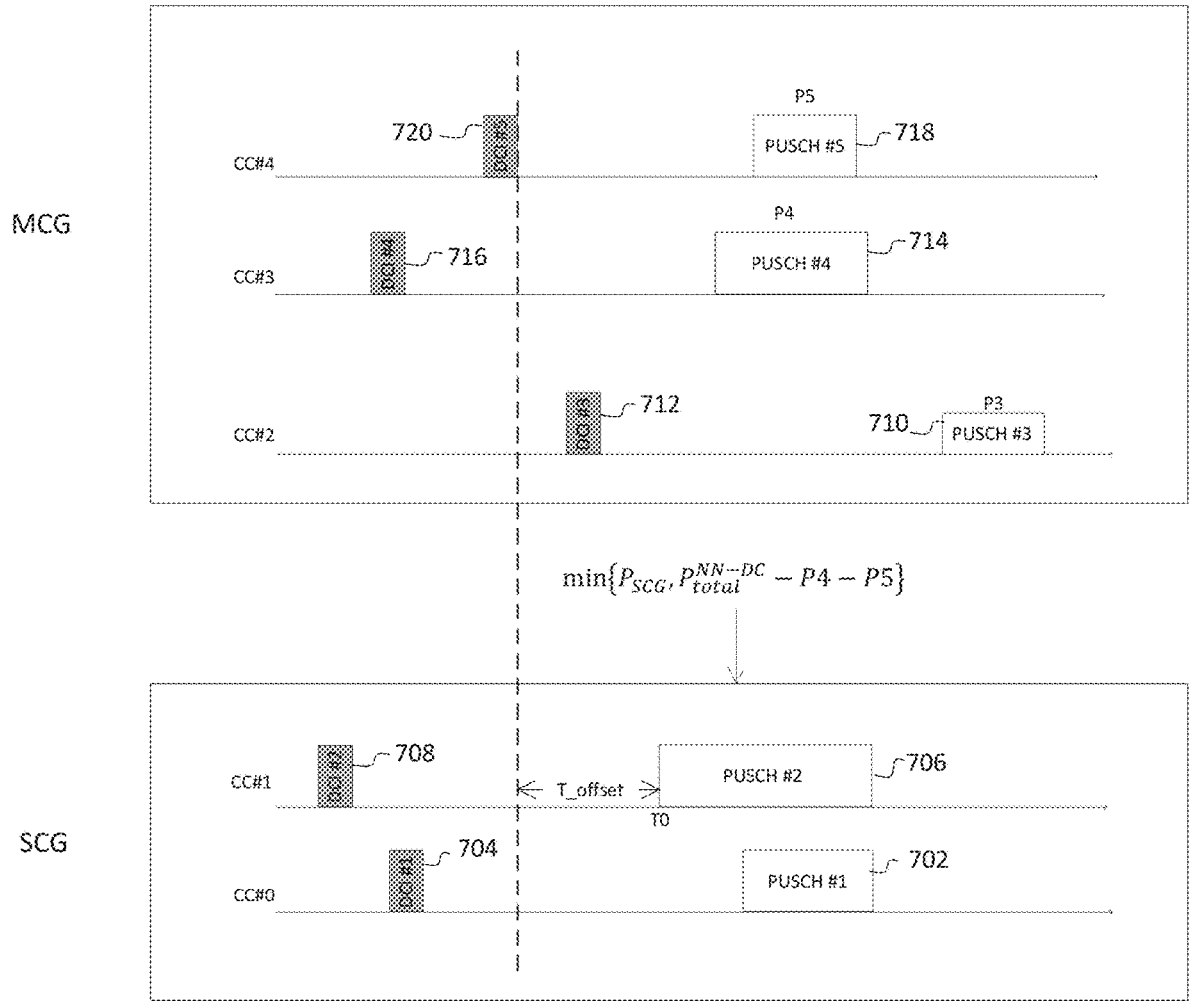
FIG. 7 is a diagram illustrating DPS with look-ahead, according to an embodiment.

FIG. 7 is a diagram illustrating DPS with look-ahead, according to an embodiment. In FIG. 7, two CCs (CC-0, CC-1) are configured in the SCG and three CCs (CC-2, CC-3, CC-4) are configured in the MCG. PUSCH-1 702 on CC-0 of the SCG is scheduled by DCI-1 on PDCCH 704 on CC-0. PUSCH-2 706 on CC-1 of the SCG is scheduled by DCI-2 on PDCCH 708 on CC-1. PUSCH-3 710 on CC-2 of the MCG is scheduled by DCI-3 on PDCCH 712 on CC-2. PUSCH-4 714 on CC-3 of the MCG is scheduled by DCI-4 on PDCCH 716 on CC-3. PUSCH-5 718 on CC-4 of the MCG is scheduled by DCI-5 on PDCCH 720 on CC-4.

Power determination for the MCG is carried out independent of SCG. Power P3 is determined for PUSCH-3 710, power P4 is determined for PUSCH-4 714, and power P5 is determined for PUSCH-5 718. In order to determine a power of an earliest PUSCH in the SCG (i.e., PUSCH-2 706), starting at time $T_0$, the UE considers all PUSCHs in the MCG that overlap with PUSCH-2 706 and whose scheduling PDCCHs are received before $T_0 - T_{offset}$ (i.e., PUSCH-4 714 and PUSCH-5 718). Since PDCCH 712 of PUSCH-3 710 is received during the offset (or after $T_0 - T_{offset}$), it does not schedule an overlapping transmission with PUSCH-2 706. The total consumed power in MCG (i.e. $P_4 + P_5$) is subtracted from the total available power and is passed to the SCG. The available power (min$\{P_{SCG}, P_{total}^{NN-DC} - P4 - P5\}$) is used as the maximum SCG power to calculate the power of PUSCH-2 706.

Accordingly, a time offset $T_{offset}$ must be determined, and may be based in part on PUSCH preparation time $T_{proc,2}$.

In one embodiment, in order to determine the power of an SCG transmission occasion, the timing offset is set to be large enough such that a UE is provided with sufficient time to decode the PDCCHs on the MCG which schedule overlapping PUSCH transmissions on MCG. Sufficient time may be provided for decoding of the scheduling DCI on the SCG and prepare for the SCG transmission. Uplink transmissions on the MCG may or may not be included depending on the UE implementation.

According to an embodiment, the value of $T_{offset}$ corresponds to PUSCH preparation time $T_{proc,2}$, which is described above, and μ corresponds to an SCS configuration among the SCS configurations of the PDCCHs scheduling the overlapping PUSCH transmission(s) on the MCG, the SCS configuration of the PDCCH scheduling the SCG PUSCH transmission occasion, and the SCS configuration of the SCG PUSCH transmission occasion.

More specifically, in order to determine μ for $T_{offset}$, the following inputs are provided: an uplink transmission occasion in the SCG on serving cell $c_{ul}^{SCG}$; a PDCCH on serving cell $c_{dl}^{SCG}$ scheduling, the uplink transmission in the SCG; a set of serving cells in the MCG $c_{dl,1}^{MCG}, c_{dl,2}^{MCG}, \ldots, c_{dl,M}^{MCG}$, such that there is at least one DCI on each cell scheduling an uplink transmission on an MCG cell that overlaps in time with the SCG transmission occasion.

$\mu_{ul}^{SCG}$ is set as the active bandwidth part (BWP) of cell $c_{ul}^{SCG}$. $\mu_{dl}^{SCG}$ is set as the active BWP of cell $c_{dl}^{SCG}$. m is initially set to 1, and while m<M, $\mu_{dl,m}^{MCG}$ is set as the active BWP of cell $c_{dl,m}^{MCG}$.

Accordingly, $\mu = \min(\mu_{ul}^{SCG}, \mu_{dl}^{SCG}, \mu_{dl,1}^{MCG}, \ldots, \mu_{dl,M}^{MCG})$.

Thus, referring back to FIG. 7, for PUSCH-2 706 in the above-described embodiment, μ is determined as $\mu = \min(\mu_0, \mu_1, \mu_2, \mu_4)$.

In another embodiment, the value of $T_{offset}$ corresponds to PUSCH preparation time $T_{proc,2}$, as described above, and μ corresponds to the smallest SCS configuration among the SCS configuration(s) of the PDCCHs scheduling the overlapping PUSCH transmission(s) in the MCG, the SCS configuration(s) of the scheduled overlapping PUSCH transmissions in the MCG, the SCS configuration of the PDCCH scheduling the SCG PUSCH transmission occasion, and the SCS configuration of the SCG PUSCH transmission occasion.

More specifically, in order to determine μ for $T_{offset}$, the following inputs are provided: an uplink transmission occasion in the SCG on serving cell $c_{ul}^{SCG}$; a PDCCH on serving cell $c_{dl}^{SCG}$ scheduling the uplink transmission in the SCG; a set of serving cells in the MCG $c_{dl,1}^{MCG}, c_{dl,2}^{MCG}, \ldots, c_{dl,M}^{MCG}$, such that there is at least one DCI on each cell scheduling an uplink transmission on an MCG cell that overlaps in time with the SCG transmission occasion; a set of serving cells in the MCG $c_{ul,1}^{MCG}, c_{ul,2}^{MCG}, \ldots, c_{ul,M}^{MCG}$, such that each of the at least one M DCI schedules an uplink transmission on a cell among the M MCG cells, where the MCG uplink transmission overlaps in time with the SCG transmission occasion.

$\mu_{ul}^{SCG}$ is set as the active BWP of cell $c_{ul}^{SCG}$. $\mu_{dl}^{SCG}$ is set as the active bandwidth part (BWP) of cell $c_{cl}^{SCG}$. m is set equal to 1, and while m<M, $\mu_{dl,m}^{MCG}$ is set as the active BWP of cell and $c_{dl,m}^{MCG}$, and $\mu_{ul,m}^{MCG}$ is set as the active BWP of cell $c_{ul,m}^{MCG}$.

Accordingly, $\mu = \min(\mu_{ul}^{SCG}, \mu_{dl}^{SCG}, \mu_{dl,1}^{MCG}, \ldots, \mu_{dl,M}^{MCG}, \mu_{ul,1}^{MCG}, \ldots, \mu_{ul,M}^{MCG})$.

Referring back to FIG. 7, according to this embodiment, for PUSCH-2 706, μ is determined as $\mu = \min(\mu_0, \mu_1, \mu_2, \mu_4, \mu_3)$.

In the above described embodiments, the cell $c_{dl}^{SCG}$ may or may not be the same as $c_{ul}^{SCG}$. Specifically, the UL and DL cells may be the same or different cells. Additionally, the cells $c_{dl,1}^{MCG}, c_{dl,2}^{MCG}, \ldots, c_{dl,M}^{MCG}$ may or may not be same cells. Specifically, the actual number of distinct cells among these M cells could be less than M. Similarly, the cells $c_{dl,1}^{MCG}, c_{dl,2}^{MCG}, \ldots, c_{dl,M}^{MCG}, c_{ul,1}^{MCG}, c_{ul,2}^{MCG}, \ldots, c_{ul,M}^{MCG}$ may or may not be the same. Specifically, the actual number of distinct cells among these 2M cells could be less than 2M.

Configured grant transmissions on the MCG that overlap with the SCG PUSCH transmission occasion may also be used in calculating the total power in SCG.

The set of transmissions on MCG which overlap with the SCG PUSCH transmission include both dynamically scheduled transmissions and semi-statically scheduled (configured grant) transmissions. The actual power of all such MCG transmissions are calculated and passed to the SCG to calculate the power of the SCG transmissions.

Figure 8:
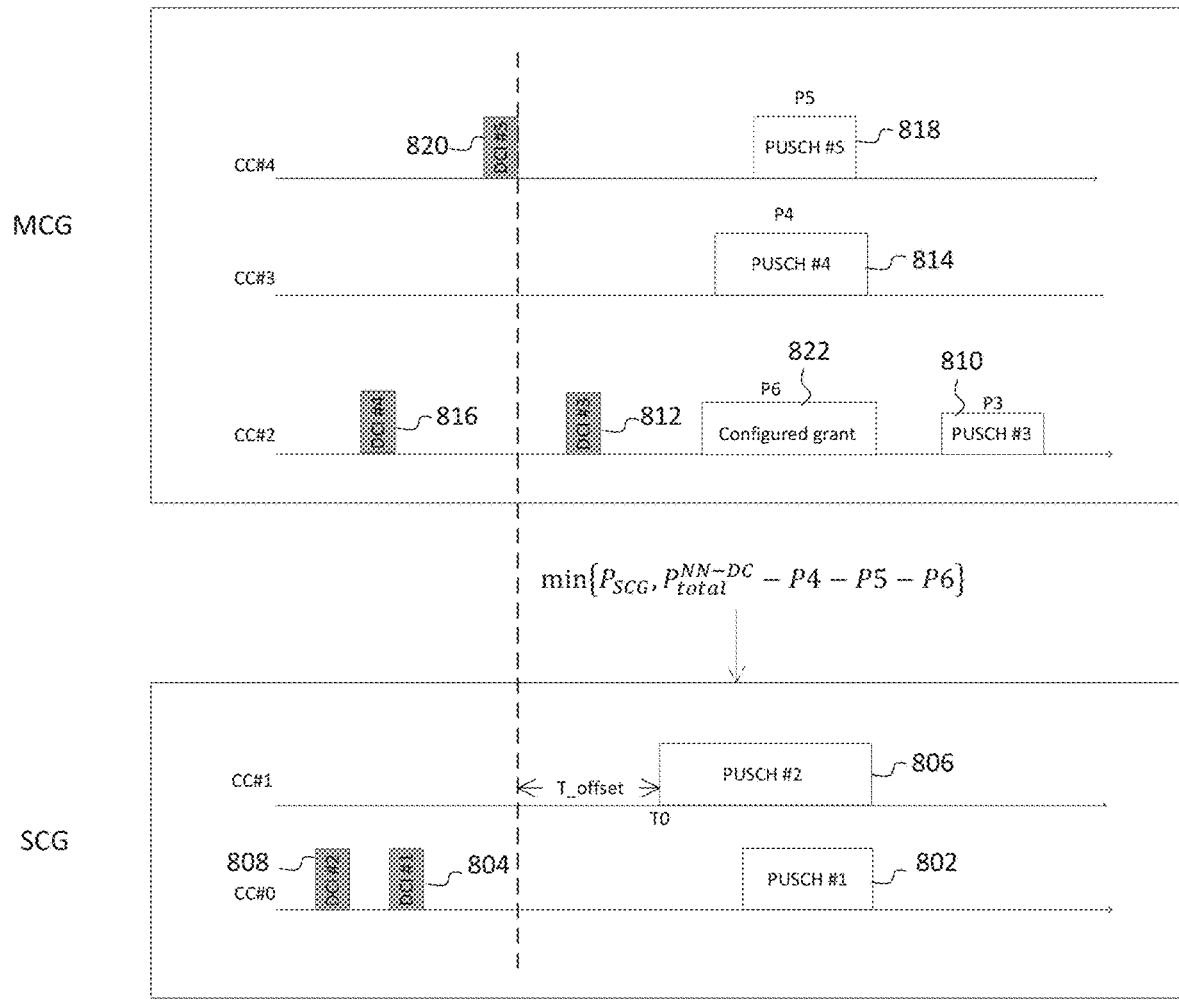
FIG. 8 is a diagram illustrating dynamic power sharing with a configured grant transmission, according to an embodiment.

Referring now to FIG. 8, a diagram illustrates dynamic power sharing with a configured grant transmission, according to an embodiment. PUSCH-1 802 on CC-0 of the SCG is scheduled by DCI-1 on PDCCH 804 on CC-0. PUSCH-2 806 on CC-1 of the SCG is scheduled by DCI-2 on PDCCH 808 on CC-0. PUSCH-3 810 on CC-2 of the MCG is scheduled by DCI-3 on PDCCH 812 on CC-2. PUSCH-4 814 on CC-3 of the MCG is scheduled by DCI-4 on PDCCH 816 on CC-2. PUSCH-5 818 on CC-4 of the MCG is scheduled by DCI-5 on PDCCH 820 on CC-4.

PUSCH-2 806 and PUSCH-4 814 are cross carrier scheduled. Specifically, PDCCH-2 808 and PUSCH-2 806 are transmitted on different CCs, and PDCCH-4 816 and PUSCH-4 814 are transmitted on different CCs.

For PUSCH-2 806, in addition to powers P4 and P5, a power P6 of configured grant transmission 822 is also included to subtract from $P_{total}^{NN-DC}$.

Figure 9:
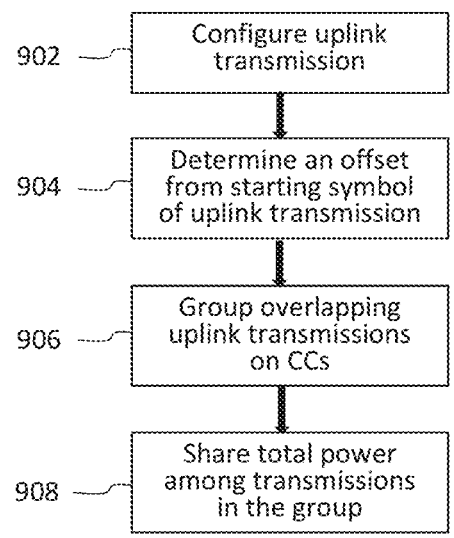
FIG. 9 is a flow chart illustrating a method for providing dynamic power sharing at a UE, according to an embodiment.

Referring now to FIG. 9, a flow chart illustrates a method for providing dynamic power sharing at a UE, according to an embodiment. At 902, an uplink transmission is configured. For example, a DCI may be received on a PDCCH for scheduling a transmission on a PUSCH. At 904, an offset is determined from a starting symbol of the uplink transmission. In an embodiment, an offset is determined for each of one or more CCs. Each offset is based on a PDDCH decoding time and a PUSCH preparation time on the respective CC. The largest offset is selected from the determined offsets. In another embodiment, a single offset is determined. The single offset is determined based on a smallest SCS selected from a group of SCSs, as described in greater detail above.

At 906, based on the offset, a group of overlapping uplink transmissions on one or more CCs is defined. The group includes the scheduled transmission. At 908, a total power is shared among uplink transmissions in the group of overlapping uplink transmissions. In an embodiment, respective power is attributed from the total power to each PUSCH transmission based on a priority order. When insufficient power remains for a PUSCH transmission, power for that transmission is scaled back or the transmission is dropped. In another embodiment, power is attributed to PUSCH transmission in the MCG, and remaining power is allocated to the scheduled transmission in the SCG.

Figure 10:
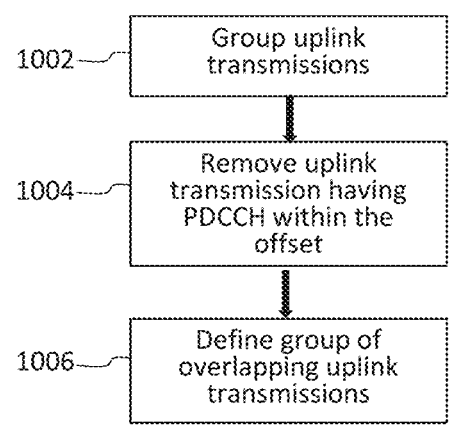
FIG. 10 is a flow chart illustrating a method for defining the group of overlapping transmissions, according to an embodiment.

Referring now to FIG. 10, a flow chart illustrates a method for defining the group of overlapping uplink transmissions, according to an embodiment. FIG. 10 is a detailed description of 906 of FIG. 9. At 1002, one or more uplink transmissions on the one or more CCs are grouped. First and last uplink transmissions overlap with at least one other uplink transmission in the group, and uplink transmissions between the first and last uplink transmissions overlap with at least two other uplink transmissions in the group. At 1004, an uplink transmission having a corresponding DCI received on a respective PDCCH that is within the offset from the starting symbol of the scheduled uplink transmission is removed from the group. In an embodiment, the offset may correspond to the CC having the respective PDCCH. At 1006, the group of overlapping uplink transmissions is defined with remaining uplink transmissions from the grouped one or more uplink transmissions.

Figure 11:
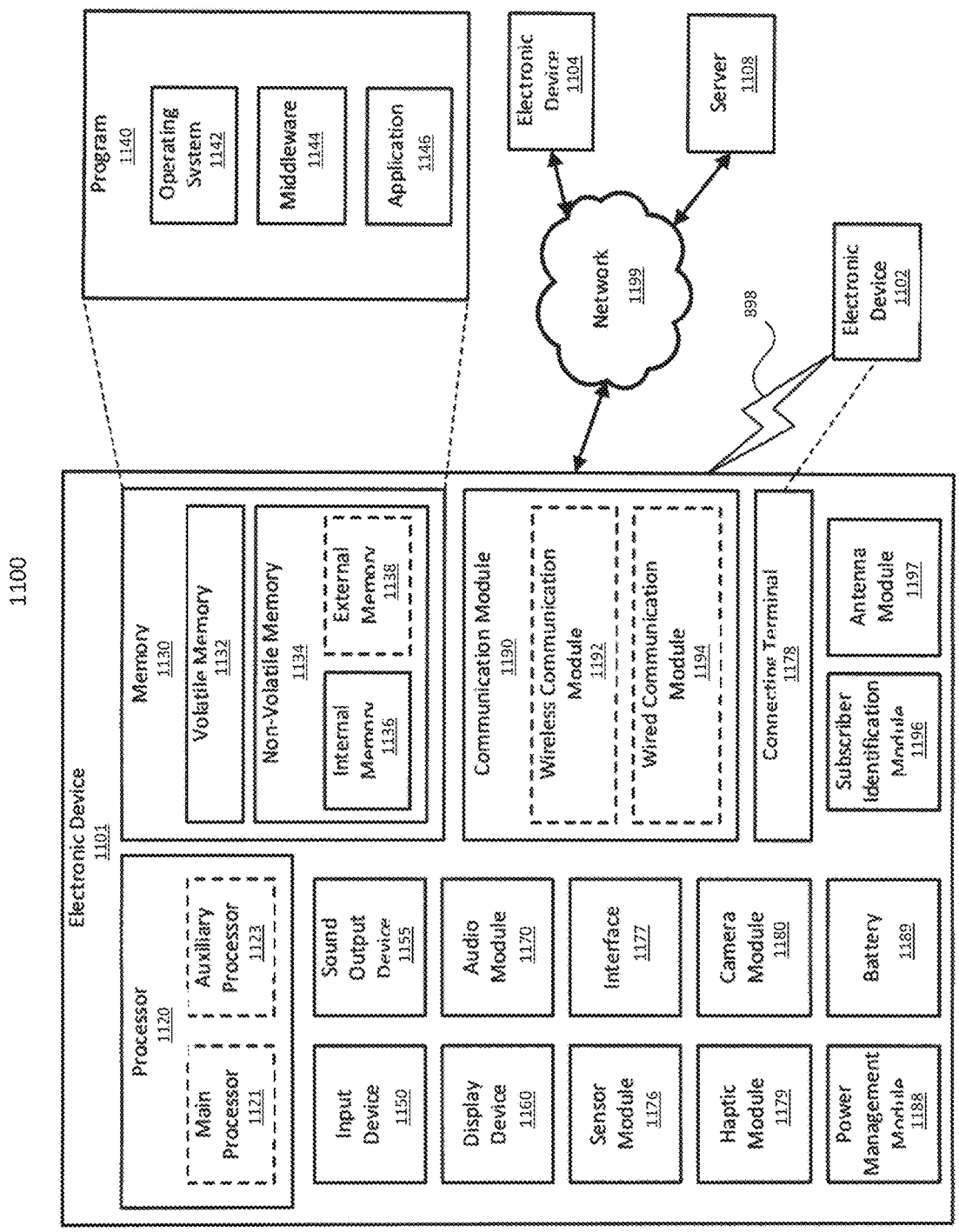
FIG. 11 is a block diagram of an electronic device in a network environment, according to an embodiment of the disclosure.

FIG. 11 is a block diagram of an electronic device in a network environment, according to one embodiment. Referring to FIG. 11, an electronic device 1101 in a network environment 1100 may communicate with an electronic device 1102 via a first network 1198 (e.g., a short-range wireless communication network), or an electronic device 1104 or a server 1108 via a second network 1199 (e.g., a long-range wireless communication network). The electronic device 1101 may communicate with the electronic device 1104 via the server 1108. The electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In one embodiment, at least one (e.g., the display device 1160 or the camera module 1180) of the components may be omitted from the electronic device 1101, or one or more other components may be added to the electronic device 1101. Some of the components may be implemented as a single integrated circuit (IC). For example, the sensor module 1176 (e.g., a fingerprint sensor, an iris sensor, or an illuminance sensor) may be embedded in the display device 1160 (e.g., a display).

The processor 1120 may execute, for example, software (e.g., a program 1140) to control at least one other component (e.g., a hardware or a software component) of the electronic device 1101 coupled with the processor 1120, and may perform various data processing or computations. As at least part of the data processing or computations, the processor 1120 may load a command or data received from another component (e.g., the sensor module 1176 or the communication module 1190) in volatile memory 1132, process the command or the data stored in the volatile memory 1132, and store resulting data in non-volatile memory 1134. The processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or execute a particular function. The auxiliary processor 1123 may be implemented as being separate from, or a part of the main processor 1121.

The auxiliary processor 1123 may control at least some of the functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). The auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by another component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. The display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. The audio module 1170 may obtain the sound via the input device 1150, or output the sound via the sound output device 1155 or a headphone of an external electronic device 1102 directly (e.g., wired) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. The sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device 1102 directly (e.g., wired) or wirelessly. The interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device 1102. The connecting terminal 1178 may include, for example, an HDMI connector, a USB connector, an SD card connector, or an audio connector (e.g., a headphone connector).

The haptic module 1179 may convert an electrical signal into a mechanical stimulus (e.g., a vibration or a movement) or an electrical stimulus which may be recognized by a user via tactile sensation or kinesthetic sensation. The haptic module 1179 may include, for example, a motor, a piezoelectric element, or an electrical stimulator.

The camera module 1180 may capture a still image or moving images. The camera module 1180 may include one or more lenses, image sensors, image signal processors, or flashes.

The power management module 1188 may manage power supplied to the electronic device 1101. The power management module 1188 may be implemented as at least part of, for example, a power management integrated circuit (PMIC).

The battery 1189 may supply power to at least one component of the electronic device 1101. The battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the AP) and supports a direct (e.g., wired) communication or a wireless communication. The communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or a standard of the Infrared Data Association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. The antenna module 1197 may include one or more antennas, and, therefrom, at least one antenna appropriate for a communication scheme used in the communication network, such as the first network 1198 or the second network 1199, may be selected, for example, by the communication module 1190 (e.g., the wireless communication module 1192). The signal or the power may then be transmitted or received between the communication module 1190 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. All or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

One embodiment may be implemented as software (e.g., the program 1140) including one or more instructions that are stored in a storage medium (e.g., internal memory 1136 or external memory 1138) that is readable by a machine (e.g., the electronic device 1101). For example, a processor of the electronic device 1101 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for providing dynamic power sharing at a user equipment (UE), the method comprising:
   configuring a first uplink transmission on a secondary cell group (SCG);
   determining, by the UE, an offset from a starting symbol of the first uplink transmission based on a physical uplink shared channel (PUSCH) preparation time for a PUSCH timing capability;
   defining, based on the offset, a group of overlapping uplink transmissions on a master cell group (MCG); and
   sharing a total power among uplink transmissions in the group of overlapping uplink transmissions on the MCG and the first uplink transmission on the SCG.

2. The method of claim 1, wherein determining the offset comprises:
   determining a plurality of offsets, wherein each offset of the plurality of offsets is determined for a respective component carrier (CC) of a plurality of CCs comprising at least the first uplink transmission; and
   defining the offset as a maximum offset of the plurality of offsets.

3. The method of claim 2, wherein each offset of the plurality offsets is based on a physical downlink control channel (PDCCH) decoding time and a PUSCH preparation time of the respective CC.

4. The method of claim 1, wherein defining the group of overlapping uplink transmissions comprises:
   grouping one or more uplink transmissions, wherein the first uplink transmission and a last uplink transmission of the one or more uplink transmissions overlap with at least one other of the one or more uplink transmissions, and each uplink transmission between the first uplink transmission and the last uplink transmission of the one or more uplink transmissions overlaps with at least two other of the one or more uplink transmissions, wherein the first uplink transmission has an earliest start symbol and the last uplink transmission has a last ending symbol;
   removing, from the grouped one or more uplink transmissions, an uplink transmission having corresponding downlink control information (DCI) received on a respective PDCCH that is within the offset from the starting symbol of the first uplink transmission; and
   defining the group of overlapping uplink transmissions with remaining uplink transmissions from the grouped one or more uplink transmissions.

5. The method of claim 1, wherein sharing the power comprises:
   determining a priority order of the uplink transmissions in the group of overlapping uplink transmissions;
   attributing respective power from the total power to each uplink transmission in the priority order;
   when insufficient power remains in the total power for a given uplink transmission in the group of overlapping uplink transmissions, scaling back a power for the given uplink transmission based on remaining power of the total power; and
   when the power is scaled back to zero for the given uplink transmission, dropping the given uplink transmission.

6. The method of claim 1, wherein sharing the power comprises:
   determining whether the first transmission overlaps, in time, with a previous group of overlapping uplink transmissions; and
   when the first transmission overlaps with the previous group, reducing, in an overlapped time region, the total power by an amount of power that is allocated to the previous group.

7. The method of claim 1, wherein the first transmission is on a component carrier (CC) of the SCG and the group of overlapping uplink transmissions are each on CCs of the MCG.

8. The method of claim 7, wherein sharing the total power comprises:
   determining a power used by each of the transmissions in the group of overlapping uplink transmissions; and
   attributing remaining power from the total power to the first transmission.

9. The method of claim 8, wherein sharing the total power further comprises:
   determining whether a configured grant transmission in the MCG overlaps the first transmission; and
   distributing power from the total power to the configured grant transmission prior to attributing the remaining power to the first transmission.

10. The method of claim 1, wherein the PUSCH preparation time is based on a subcarrier spacing (SCS).

11. The method of claim 10, wherein the SCS is a smallest SCS from among at least an SCS of a first PDCCH scheduling the first uplink transmission, an SCS of the first uplink transmission, and SCSs of PDCCHs scheduling uplink transmissions on the MCG that overlap the first uplink transmission.

12. The method of claim 11, wherein the SCS is the smallest SCS also from among SCSs of the uplink transmissions on the MCG that overlap the first uplink transmission.

13. A user equipment (UE) comprising:
   a processor; and
   a non-transitory computer readable storage medium storing instructions that, when executed, cause the processor to:
      configure a first uplink transmission on a secondary cell group (SCG);

determine an offset from a starting symbol of the first uplink transmission based on a physical uplink shared channel (PUSCH) preparation time for a PUSCH timing capability;

define, based on the offset, a group of overlapping uplink transmissions on a master cell group (MCG); and share a total power among uplink transmissions in the group of overlapping uplink transmissions on the MCG and the first uplink transmission on the SCG.

14. The UE of claim 13, wherein, in determining the offset, the instructions further cause the processor to:

determine a plurality of offsets, wherein each offset of the plurality of offsets is determined for a respective component carrier (CC) of a plurality of CCs comprising at least the first uplink transmission; and defining the offset as a maximum offset of the plurality of offsets.

15. The UE of claim 13, wherein, in defining the group of overlapping uplink transmissions, the instructions further cause the processor to:

group one or more uplink transmissions, wherein the first uplink transmission and a last uplink transmission of the one or more uplink transmissions overlap with at least one other of the one or more uplink transmissions, and each uplink transmission between the first uplink transmission and the last uplink transmission of the one or more uplink transmissions overlaps with at least two other of the one or more uplink transmissions, wherein the first uplink transmission has an earliest start symbol and the last uplink transmission has a last ending symbol;

remove, from the grouped one or more uplink transmissions, an uplink transmission having corresponding downlink control information (DCI) received on a respective PDCCH that is within an offset from the starting symbol of the first transmission, wherein the offset corresponds to a CC having the respective PDCCH; and define the group of overlapping uplink transmissions with remaining uplink transmissions from the grouped one or more uplink transmissions.

16. The UE of claim 13, wherein, in sharing the power, the instructions further cause the processor to:

determine a priority order of the uplink transmissions in the group of overlapping uplink transmissions;

attribute respective power from the total power to each uplink transmission in the priority order;

when insufficient power remains in the total power for a given uplink transmission in the group of overlapping uplink transmissions, scale back a power for the given uplink transmission based on remaining power of the total power; and when the power is scaled back to zero for the given uplink transmission, drop the given uplink transmission.

17. The UE of claim 13, wherein the first transmission is on a component carrier (CC) of the SCG and the group of overlapping uplink transmissions are each on CCs of the MCG.

18. The UE of claim 13, wherein the PUSCH preparation time is based on a subcarrier spacing (SCS).

19. The UE of claim 18, wherein the SCS is a smallest SCS from among at least an SCS of a first physical downlink control channel (PDCCH) scheduling the first uplink transmission, an SCS of the first uplink transmission, and SCSs of PDCCHs scheduling uplink transmissions on the MCG that overlap the first uplink transmission.

20. The UE of claim 19, wherein the SCS is the smallest SCS also from among SCSs of the uplink transmissions on the MCG that overlap the first uplink transmission.

21. The UE of claim 13, wherein, in sharing the power, the instructions further cause the processor to:

determine a power used by each of the transmissions in the group of overlapping uplink transmissions; and attribute remaining power from the total power to the first transmission.

* * * * *